United States Patent [19]
DeSimone et al.

[11] Patent Number: 5,872,157
[45] Date of Patent: Feb. 16, 1999

[54] METHOD FOR OLEFIN OXIDATION

[75] Inventors: Joseph M. DeSimone, Chapel Hill; Timothy J. Romack, Durham, both of N.C.

[73] Assignee: The University of North Carolina at Chapel Hill, Chapel Hill, N.C.

[21] Appl. No.: 593,838

[22] Filed: Jan. 30, 1996

[51] Int. Cl.$^6$ ............................... C08F 4/28; C08F 2/48; C08F 14/18

[52] U.S. Cl. ................... 522/5; 522/79; 522/178; 522/181; 522/184; 522/185; 522/186; 522/187; 522/189; 524/795; 526/235; 526/245; 526/246; 526/247; 526/250; 526/255

[58] Field of Search .................. 522/187, 181, 522/184, 185, 186, 189, 178, 79, 5; 524/795; 526/235, 245, 246, 247, 250, 255

[56] References Cited

U.S. PATENT DOCUMENTS

| | | | |
|---|---|---|---|
| 3,442,942 | 5/1969 | Sianesi et al. | 260/544 |
| 3,522,228 | 7/1970 | Fukui et al. | 522/187 |
| 3,720,646 | 3/1973 | Sianesi et al. | 260/63 HA |
| 4,451,646 | 5/1984 | Sianesi et al. | 528/401 |
| 4,970,093 | 11/1990 | Sievers et al. | 427/38 |
| 5,104,911 | 4/1992 | Marchionni et al. | 522/187 |
| 5,143,589 | 9/1992 | Marchionni et al. | 204/157.92 |
| 5,236,602 | 8/1993 | Jackson | 210/748 |
| 5,237,108 | 8/1993 | Marraccini et al. | 568/615 |
| 5,345,013 | 9/1994 | Van Bramer et al. | 570/102 |
| 5,386,055 | 1/1995 | Lee et al. | 562/512.2 |

FOREIGN PATENT DOCUMENTS

| | | | |
|---|---|---|---|
| 611156 | 12/1960 | Canada | 522/184 |
| 0791701 | 8/1968 | Canada | 522/187 |
| 1199312 | 8/1967 | United Kingdom | 522/187 |
| 1097679 | 1/1968 | United Kingdom | 522/187 |

OTHER PUBLICATIONS

V. Caglioti et al.; *Oxidation of Tetrafluoroethylene by Molecular Oxygen*, J. Chem. Soc. 5430–5433 (1964).

F. Gozzo et al.; *Oxidation Reactions of Tetrafluoroethylene and Products Therefrom–II*, Tetrahedron 22:2181–2190 (received Dec. 1965).

D. Sianesi et al.; *Perfluoropolyethers (PFPEs) from Perfluoroolefin Photoozidation*, Organofluorine Chem. pp. 31–461 (1994).

*Primary Examiner*—Susan W. Berman
*Attorney, Agent, or Firm*—Myers Rigel Sibley & Sajovec, P.A.

[57] ABSTRACT

A process for making oxidized olefins is disclosed. Specifically, the process comprises providing an olefin and oxygen in combination in a reaction medium comprising carbon dioxide, and then oxidizing the olefin in the reaction medium to make the oxidized olefin. Preferably, a perfluoropolyether is produced by the process.

26 Claims, No Drawings

METHOD FOR OLEFIN OXIDATION

FIELD OF THE INVENTION

The present invention relates to a process for producing oxidized olefins. More particularly, the invention relates to a process for producing oxidized olefins using a reaction medium containing carbon dioxide.

BACKGROUND OF THE INVENTION

Oxidized olefins such as polyethers, and in particular fluoropolyethers, are employed in numerous applications. In particular, these compounds possess a number of physical properties such as low volatility, high thermal and chemical stability, and low electrical conductivity which makes them suitable for a wide range of end uses. For example, perfluropolyethers may be utilized in lubricating valves and bearings associated with reactive gas handling; as emulsions in cosmetics; and as defoamers. In addition, the compounds are also desirable for use as treatment agents in protecting the surfaces of buildings and other structures from environmental contaminants.

Fluoropolyethers are manufactured primarily by two techniques, one which involves the ring opening polymerization of cyclic ethers such as hexafluropropylene oxide and 1,1'-tetrafluorooxetane, and the second which involves the photooxidative polymerization of fluorinated olefins. In general, the use of photooxidative polymerization is preferred because of the wider range of products that can be prepared from a limited number of polyolefins.

Photooxidative polymerization reactions are often carried out in a liquid solution which contains an organic solvent. The range of solvents which may be employed has been known to be limited due to the fact that the fluoroolefins are essentially insoluble in most organics, with the exception of perfluoro and chloro fluorocarbon solvents. The formation of polyethers in these solvents is described in U.S. Pat. Nos. 3,442,942; 3,720,646; and 4,451,646 to Sianesi et al; and 5,143,589 and 5,237,108 to Marraccini et al. The utilization of these solvents, however, has been found to become increasingly undesirable due to the expense and heightened environmental risks associated with such. Moreover, when low molecular weight, low boiling polyether compounds are prepared in these solvents, separation of the compounds from the solvents can be difficult, especially when the compounds and solvents display similar properties.

In view of the foregoing, it is an object of the present invention to provide a process for producing oxidized olefins which employs a more cost-effective and environmentally-acceptable reaction medium. Such oxidized olefins may include, for example, fluorinated polyethers and low molecular weight fluorocarbons made from fluoroolefins.

It is another object of the present invention to provide a process for making oxidized olefins which allows for easier separation of the oxidized olefins from the reaction medium.

It is a yet a further object of the present invention to provide mixtures of components which may be utilized in the above process.

SUMMARY OF THE INVENTION

These and other objects are satisfied by the present invention which includes as a first aspect a process for producing an oxidized olefin. The process comprises providing an olefin and oxygen in combination in a reaction medium which comprises carbon dioxide, and oxidizing the olefin in the reaction medium to make the oxidized olefin. Preferably, the oxidizing step is carried out in the presence of ultraviolet light.

The reaction medium used in the process may comprise supercritical, liquid, or gaseous carbon dioxide. The olefin which is oxidized is preferably a fluoroolefin selected from the group consisting of vinyl fluoride, trifluoroethylene, chlorotrifluoroethylene, bromotrifluoroethylene, 1,2-difluoroethylene, $CF_2=CFOCF_2CF(CF_3)OCF_2CF_2SO_2F$; $CF_2=CFOCF_2CF(CF_3)OCF_2CF_2CO_2CH_3$, $CF_2=CFOCF_2CF(CF_3)OCF_2CF_2CH_2OH$, tetrafluoroethylene, hexafluoropropylene, octafluoroisobutylene, perfluorobutene, perfluoropentene, perfluoro(methyl vinyl ether), perfluoro(propyl vinyl ether), perfluoro(2,2-dimethyl-1,3-dioxole), and perfluorocyclobutene.

The process also provides a step for separating the oxidized olefin from the reaction medium subsequent to its formation. In addition, in the embodiment where the oxidized olefin has peroxide linkages, the invention provides a step for decomposing the peroxide linkages from the oxidized olefin to form oxidized olefin radicals.

The present invention includes as a second aspect a mixture of components useful for carrying out the oxidation of an olefin. The mixture comprises an olefin, oxygen, and a reaction medium which comprises carbon dioxide. The olefin and oxygen are present in combination in the carbon dioxide.

DETAILED DESCRIPTION OF THE PREFERRED EMBODIMENTS

The present invention is primarily directed to a process for producing oxidized olefins. Specifically, the process comprises providing an olefin and oxygen in combination in a reaction medium which comprises carbon dioxide. The olefin and oxygen are solubilized in the carbon dioxide, and the olefin and oxygen then react in the carbon dioxide. Subsequently, the olefin becomes oxidized in the reaction medium to form an oxidized olefin. The oxidized olefin is soluble in the carbon dioxide. As explained herein, the oxidized olefin may be in form of many end products, including, for example, a fluorinated polyether or a small molecule which results from the oxidation of a fluoroolefin. The process may further comprise the step of separating the oxidized olefin from the reaction medium. The invention also provides a process for producing an oxidized olefin in which an oxidized olefin, a component and a reaction medium is provided and then the component and oxidized olefin react to form an oxidized olefin functionalized with the component. The oxidized olefin of the invention may comprise peroxide linkages. Accordingly, the invention includes a step which decomposes the peroxide linkages from the oxidized olefin.

For the purposes of the invention, carbon dioxide is employed in the reaction medium in a liquid, gaseous, or supercritical phase. If liquid $CO_2$ is used, the temperature employed during the process is preferably below 31° C. More specifically, liquid $CO_2$ may be obtained at temperatures from about −55° C. to about 31° C. and pressures from about 70 psi to 1100 psi. If gaseous $CO_2$ is used, it is preferred that the phase be employed at high pressure. As used herein, the term "high pressure" generally refers to $CO_2$ having a pressure from about 20 to about 73 bar. Preferably, the $CO_2$ is utilized in a "supercritical" phase. As used herein, "supercritical" means that a fluid is at a temperature that is sufficiently high that it cannot be liquified by pressure. The thermodynamic properties of $CO_2$ are reported in Hyatt, *J.*

Org. Chem. 49: 5097–5101 (1984); therein, it is stated that the critical temperature of $CO_2$ is about 31° C. and the critical pressure is about 1070 psi; thus the method of the present invention should be carried out at a temperature above 31° and a pressure above 1070 psi. The reaction medium preferably comprises from about 5 to 99 percent by weight of $CO_2$ based on the weight of the reaction medium, and more preferably from about 50 to 80 percent by weight $CO_2$.

The reaction medium may also comprise one or more cosolvents along with the $CO_2$. Illustrative cosolvents include, but are not limited to, perfluorocarbons, hydrofluorocarbons, and perfluoropolyethers. The cosolvent may be added in order to depress the freezing point of the $CO_2$ which allows the reaction to be carried out at lower temperatures. It is preferred that the cosolvent be substantially inert to reaction with oxygen under the conditions employed in the process of the invention.

Numerous olefins may be employed in the process of the invention and those which are preferred include fluoroolefins. Any suitable fluoroolefins may be employed including those containing functional groups. Suitable functional groups include, for example, esters, sulfonyl fluoride, hydroxyl, or vinyl. Particularly suitable fluoroolefins may be those with at least one fluorine atom attached to the vinyl moiety and include, but are not limited to vinyl fluoride; trifluoroethylene; chlorotrifluoroethylene; bromotrifluoroethylene; 1,2-difluoroethylene. $CF_2$=$CFOCF_2CF(CF_3)$ $OCF_2CF_2SO_2F$; $CF_2$=$CFOCF_2CF(CF_3)$ $OCF_2CF_2CO_2CH_3$; $CF_2$=$CFOCF_2CF(CF_3)$ $OCF_2CF_2CH_2OH$; $CF_2$=$CFOCF_2CF_2SO_2FSF(CF_2)_nCH_2)$ $CF$=$CF_2$ where n=1,2,3,4, or 5; $RCH_2OCF$=$CF_2$ where R is hydrogen or $F(CF_2)_m$ where m=1, 2, or 3; and $ROCF$=$CH_2$ where R is $F(CF_2)_m$ where m is 1,2,3 or 4. Linear or branched fluorinated olefins having the formula $CnF_{2n}$ where n=2–20 are also suitable and include compounds such as tetrafluoroethylene; hexafluoropropylene; octafluoroisobutylene; perfluorobutene; perfluoropentene; perfluoro(methyl vinyl ether); perfluoro(ethyl vinyl ether) perfluoro(propyl vinyl ether); perfluoro(2,2-dimethyl-1,3-dioxole); and perfluorocyclobutene. Preferred fluorinated olefins are tetrafluoroethylene, chlorotrifluoroethylene, 2,2-dimethyl-1,3-dioxole, hexafluoropropylene, perfluoro (methylvinyl ether), and perfluoro(propyl vinyl ether). Combinations of fluorinated olefins may be employed when it is desired to produce polyethers in the form of copolymers. Suitable combinations include hexafluoropropylene/ tetrafluoroethylene, as well as those utilizing perfluoro (propyl vinyl ether), $CF_2$=$CFOCF_2CF(CF_3)$ $OCF_2CF_2SO_2F$, $CF_2$=$C$ $FOCF_2CF(CF_3)$ $OCF_2CF_2CO_2CH_3$, tetrafluoroethylene, and hexafluoropropylene. The olefins are preferably employed in an amount ranging from about 1 to 95 percent based on the weight of the reaction medium and more preferably, from about 5 to 50 percent by weight.

A wide number of known and suitable oxidized olefins may be made by the present invention. In one embodiment, polyethers can be produced, more preferably fluoropolyethers, and most preferably perfluoropolyethers. In another embodiment, low molecular weight molecules may be produced from the oxidation process, which preferably includes those which comprise fluorine, oxygen, and carbon. In general, the preferred structure of the perfluoropolyethers will have a backbone comprised mainly of the units:

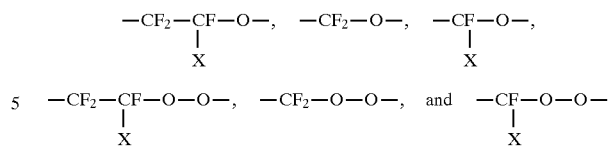

wherein X is fluorine, trifluoromethyl, or suitable other fluoroalkyl or fluoroether groups. As is known by those skilled in the art, the exact distribution of these structures obtained in the fluorinated polyether will be a function of reaction conditions including the viscosity of the reaction medium. The viscosity of the solvent will influence effects which play an important role in radical recombination reactions. End groups which may be present on the perfluoropolyether include acid fluoride, formyl fluoride, or other fluoroalkyl species. The perfluoropolyethers may also contain a group which imparts functionality to the polymer. In particular, such a group may be located at the end of the polymer chain, or on random sites along the chain. Low molecular weight compounds may include, for example, the oxidation products of hexafluoropropylene such as trifluoroacetyl fluoride, carbonyl fluoride, hexafluoropropylene oxide, and the like. Low molecular weight compounds derived from other components such as tetrafluoroethylene may also be produced.

For the purposes of the invention, functionality may be imparted to the oxidized olefin by oxidizing an olefin which contains functionality, or by reacting the oxidized olefin with a suitable component to form an oxidized olefin functionalized with the component. Suitable components include monomers and chain transfer agents. Functionality may also be imparted to the oxidized olefin by removing peroxide linkages from the oxidized olefin by reacting the oxidized olefin with a suitable reagent, described in greater detail herein. Exemplary monomers which may be utilized include, but are not limited to, $CF_2$=$CFOCF_2CF(CF_3)$ $OCF_2CF_2SO_2F$, $CF_2$=$CFOCF_2CF(CF_3)OCF_2CF_2CO_2CH_3$, $CF_2$=$CFOC$ $F_2CF(CF_3)OCF_2CF_2CH_2OH$, and $CF_2$=$CF$ $(CF_2)Cl$. Other monomers which may be used contain functional groups such as, for example, acid fluoride, epoxy, amide, cyano, alcohol, and amine. As a specific example, perfluorobutadiene may be used in which one double bond undergoes photooxidative polymerization and the other bond is oxidized to a functional group, such as an epoxide, in the oxidized olefin. Suitable chain transfer agents include compounds, for example, which contain a halogen group such as chlorine, bromine, or iodine.

The process of the present invention is preferably carried out in the presence of light, preferably ultraviolet light. As known, the actual wavelength and distribution of wavelengths employed as well as the intensity of the light can effect oxidized olefin yield, as well as its molecular weight and chemical composition such as peroxide content and carbon-to-oxygen ratio. Accordingly, those skilled in the art will appreciate that manipulation of the light source can be used to optimize yields under various conditions to favor formation of one type of oxidized olefin over another. Ultraviolet light is preferably employed having a wavelength from 180 nm to 500 nm.

The process of forming an oxidized olefin can be carried out using apparatus and conditions known to those skilled in the art. As an example, the process may be carried out in batch, semi-batch or continuous modes in an appropriate reaction vessel, preferably one that may withstand high pressures. A suitable high pressure reaction vessel may employ various means and features to facilitate the formation of the oxidized olefins. For example, the vessel may use heating means such as an electric furnace to bring the reaction to the desired temperature. Mixing means can also be used in the reaction vessel and include stirrers such as paddle stirrers, impeller stirrers, blades, and the like.

In particular, the process of forming an oxidized olefin usually begins by feeding a mixture of olefin and carbon dioxide into the reaction vessel. In a usual instance, the carbon dioxide constitutes the reaction medium in which the process is carried out although other components may be present. The vessel is then closed and is brought to the desired temperature and pressure. The reaction is preferably carried out at a temperature from about −80° C. to about 200° C., and more preferably, from about −60° C. to about 80° C. The pressure employed during the reaction preferably ranges from about 15 psi to about 20,000 psi, and more preferably from about 50 psi to about 5,000 psi. Oxygen is then supplied to the reaction mixture. In general, the oxygen may be added to the reaction vessel all at once or may be added continuously by bubbling it through the olefin and carbon dioxide in the event that liquid carbon dioxide is employed. A positive pressure of oxygen may be maintained in the vessel if desired, so as to replenish the oxygen which is consumed in the reaction. For the purposes of the invention, the oxygen may be added in its pure molecular form or may be diluted with an inert diluent such as nitrogen to reduce the potential for an explosion. During addition of the oxygen, the mixture is preferably irradiated with light to promote the carrying out of the reaction. The reaction proceeds until the desired yield of oxidized olefin is obtained.

In an alterative embodiment, the oxygen and olefin may be added simultaneously to the reactor. As an example, the two components may be added continuously in the event that a continuous or a semi-batch reaction mode is utilized.

As is known, oxidized olefin compounds, and in particular perfluoropolyethers, often comprise excess peroxide linkages. It is often desirable to remove the excess peroxide linkages in order to add stability to the compound. The present invention provides a process step in which the peroxide linkages are decomposed from these compounds which may be carried out, for example, by chemical, photochemical, or thermal means. The method of peroxide removal must be compatible in carbon dioxide, with the peroxide removal being accomplished directly in the carbon dioxide, either in-situ or as a separate step subsequent to the formation of the oxidized olefin. Chemically, the peroxide linkages may be removed by reacting the oxidized olefins with reagents including appropriate bases such as amines, hydroxide, fluorine, and bromine. Photochemically, the linkages may be removed by employing a suitable compound such as a quinone in conjunction with ultraviolet light, preferably of a wavelength between 240 nm and 400 nm.

In removing the peroxide linkages from the oxidized olefins, oxidized olefin free radicals are formed which are capable of reacting with numerous types of compounds so as to form a variety of products. For example, as is known, reacting the oxidized olefins with a reagent such as a suitable base or fluoride at elevated temperatures, or bromine, yields an oxidized olefin (e.g., a perfluoropolyether) which is functionalized at the end of the polymer chain. For example, a perfluoropolyether having bromine-containing end groups may be formed. Additionally, removal of oxidized olefin (e.g., perfluoropolyether) peroxide linkages using either a thermal method or ultraviolet light in combination with a quinone compound results in the formation of an oxidized olefin bridged by the quinone. As is known, the resulting oxidized olefin is capable of undergoing subsequent free radical polymerization with a suitable monomer such as a vinyl monomer, which is capable of leading to the formation of functional copolymers such as block or blocky copolymers. In addition, a suitable polymer may be provided and the oxidized olefin radicals may be grafted onto the polymer.

An advantage afforded by a reaction medium which comprises carbon dioxide is the high solubility of hydrocarbon-based monomers relative to many fluorinated solvents, including fluorinated polyether-based solvents, which will allow for the synthesis of new materials not possible in fluorinated solvents.

Subsequent to the formation of any of the oxidized olefin compounds referred to herein, the present invention further provides a step for separating the oxidized olefin from the reaction medium. Any of the known and suitable techniques may be employed to carry out this process step. For example, the oxidized olefin may be separated from the reaction medium by venting the reaction medium to the atmosphere or to a recycle stream. Additionally, the oxidized olefin may be extracted and transferred with the carbon dioxide to another vessel. Subsequently, the carbon dioxide is expanded to lower pressure and is allowed to escape, which causes the oxidized olefin to separate from the carbon dioxide.

In the event that multiple compounds are formed in the oxidation reaction, any of the suitable techniques may be employed to separate the compounds. For example, pressure and temperature profiling techniques may be used in all reaction modes. Specifically, the profiling may be done continuously or, in the case of a batch mode, may be accomplished by extracting the compounds by employing different pressures and temperatures throughout the reaction.

The oxidized olefins produced in accordance with the invention may be employed in a wide variety of end uses. Perfloropolyethers, for example, can be used as lubricants which possess adequate physical properties to enable them to withstand extreme pressure and temperature conditions; thermal shock fluids; and as heat transfer/cooling media. Functional polyethers, and more specifically functional perfluoropolyethers, may be used as cosmetics, in emulsion applications, and as coatings such as those used in protecting exposed surfaces such as stone. Low molecular weight compounds are useful when employed in a number of chemical syntheses. For example, hexafluoropropylene oxide is useful in the preparation of fluoroalkyl vinyl ester monomers such as perfluoro (propyl vinyl ether), perfluoro (methyl vinyl ether). Additionally, carbonyl fluoride is useful in the preparation of perfluoro (methyl vinyl ether).

The present invention is explained in greater detail herein in the following examples, which are illustrative and are not to be construed as limiting of the invention. In the following examples, "psi" means pounds per square inch, and $^{19}F$ NMR means fluorine nuclear magnetic resonance spectroscopy.

EXAMPLE 1

Photooxidation of Hexafluoropropylene

A 25-mL high pressure reactor, with a sapphire window to allow the introduction of light, is maintained at a temperature of approximately −10° C. 10 grams hexafluoropropylene is condensed into the reactor at high pressure, 11 grams liquid carbon dioxide is added, and the cell is charged with molecular oxygen to approximately 2000 psi. The cell is then subjected to irradiation through the sapphire window using a 140 watt mercury arc lamp (Hanovia model 616A-

13) for 24 hours. The reactor is then pressurized to 2500 psi with carbon dioxide and extracted with three reactor volumes into a cold trap maintained at −78° C., thus allowing the carbon dioxide to escape into the atmosphere. 0.5 grams of clear, viscous, fluid is then collected in the cold trap, corresponding to a 5% yield of perfluoropolyether (based on hexafluoropropylene). Analysis using $^{19}$F NMR spectroscopy is consistent with a perfluoropolyether structure.

EXAMPLE 2

Photooxidation of Hexafluoropropylene

The reactor described in Example 1 is employed under the conditions described except that 9.9 grams hexafluoropropylene and 12 grams liquid carbon dioxide is used. Additionally, the reactor is maintained at a temperature of 0° C. 0.5 grams of clear, viscous, fluid is collected in the cold trap. Analysis using $^{19}$F NMR spectroscopy is consistent with a perfluoropolyether structure.

EXAMPLE 3

Photooxidation of Hexafluoropropylene

The procedure described in Example 1 is employed in which 9.8 grams of hexafluoropropylene is condensed and 12 grams of carbon dioxide is used. The temperature of the reactor is maintained at 20° C. and 0.4 grams of clear, viscous fluid is collected in the cold trap corresponding to a 4% yield. Analysis using $^{19}$F NMR spectroscopy is consistent with a perfluoropolyether structure.

EXAMPLE 4

Photooxidation of Hexafluoropropylene

The procedure described in Example 1 is employed in which 10.1 grams hexafluoropropylene is condensed, 12 grams liquid carbon dioxide is added, and the cell is charged with 600 psi molecular oxygen. The cell is then subjected to irradiation for 6 hours. 2.2 grams of clear, viscous, fluid is collected in the cold trap corresponding to a 22% yield of perfluoropolyether (based on hexafluoropropylene). Analysis using $^{19}$F NMR spectroscopy is consistent with a perfluoropolyether structure.

EXAMPLE 5

Photooxidation of Hexafluoropropylene

The procedure described in Example 4 is employed in which 7.9 grams of hexafluoropropylene is condensed and 12.1 grams liquid carbon dioxide is added to the reactor. 1.9 grams of a clear, viscous, fluid is collected in the cold trap corresponding to a 24% yield of perfluoropolyether (based on hexafluoropropylene). Analysis using $^{19}$F NMR spectroscopy is consistent with a perfluoropolyether structure.

EXAMPLE 6

Photooxidation of Perfluoro(Propyl Vinyl Ether)

The procedure described in Example 4 is employed in which 10.7 grams of perfluoro (propyl vinyl ether) is condensed, 12 grams liquid carbon dioxide is added, and the cell is subjected to irradiation for 24 hours. 2.1 grams of a clear, viscous, fluid is collected in the cold trap corresponding to a 19% yield of perfluoropolyether [based on perfluoro (propyl vinyl ether)]. Analysis using $^{19}$F NMR spectroscopy is consistent with a perfluoropolyether structure.

EXAMPLE 7

Photooxidation of EVE ($CF_2$=$CFOCF_2CF(CF_3)$ $OCF_2CF_2CO_2CH_3$)

The procedure described in Example 6 is employed in which 12 grams ester vinyl ether ($CF_2$=$CFOCF_2CF(CF_3)$ $OCF_2CF_2CO_2CH_3$) is added to the reactor via syringe and 12 grams liquid carbon dioxide is also added. 11.2 grams of a clear fluid is collected in the cold trap corresponding to a 95% yield of perfluoropolyether (based on hexafluoropropylene). Analysis using $^{19}$F NMR spectroscopy is consistent with a perfluoropolyether structure.

EXAMPLE 8

Photooxidation of Hexafluoropropylene

The procedure described in Example 1 is employed with the reactor being maintained at a temperature of approximately −5 ° C. 11.2 grams hexafluoropropylene is condensed in at high pressure, 11.5 grams liquid carbon dioxide is added, and the cell is subject to irradiation using a 450 watt mercury arc lamp (Hanovia Model 679A36). 5.5 grams of a clear, fluid is collected in the cold trap corresponding to a 49% yield of perfluoropolyether (based on hexafluoropropylene). Analysis using $^{19}$F NMR spectroscopy is consistent with a perfluoropolyether structure.

EXAMPLE 9

Photooxidation of Hexafluoropropylene

The procedure described in Example 8 is employed in which 10.6 grams of hexafluoropropylene is condensed in at high pressure, and 13 grams liquid carbon dioxide is added. The temperature is raised to 20° C. prior to the cell being charged with oxygen. 7.1 grams of a clear, fluid is collected in the cold trap corresponding to a 70% yield of perfluoropolyether (based on hexafluoropropylene). Analysis using $^{19}$F NMR spectroscopy is consistent with a perfluoropolyether structure.

EXAMPLE 10

Photooxidation of Hexafluoropropylene

The procedure described in Example 9 is employed in which 10.2 grams hexafluoropropylene is condensed in at high pressure and 12 grams liquid carbon dioxide is added. The temperature is raised to 60° C., and the cell is charged with molecular oxygen to approximately 2,500 psi. Oxygen is supplied continuously to the reactor. 0.5 grams of a clear fluid is collected in the cold trap corresponding to a 5% yield of perfluoropolyether (based on hexafluoropropylene). Analysis using $^{19}$F NMR spectroscopy is consistent with a perfluoropolyether structure. Analysis of portions of the gaseous products shows evidence of carbonyl fluoride and trifluoroacetyl fluoride in addition to other low molar mass fluorooxy compounds.

EXAMPLE 11

Co-photooxidation of Tetrafluoroethylene and Hexafluoropropylene

The procedure described in Example 10 is employed with the temperature being maintained at approximately −10° C. 6.0 grams hexafluoropropylene is condensed in at high pressure, followed by the addition of 10 grams of a 50/50 wt/wt mixture of tetrafluoroethylene (5 g) and carbon dioxide (5 g). 6 grams of additional liquid carbon dioxide is added to the reactor, and the cell is charged with molecular oxygen to approximately 1,500 psi. 5.0 grams of a clear, fluid is collected in the cold trap corresponding to a 45% yield of perfluoropolyether (based on hexafluoropropylene). Analysis using $^{19}F$ NMR spectroscopy is consistent with a perfluoropolyether structure.

EXAMPLE 12

Thermal Oxidation of Hexafluoropropylene

The reactor described in Example 1 is employed with 10 grams of hexafluoropropylene and 10 grams of $CO_2$, except that the temperature employed in 100° C. and the oxidation is carried out in the absence of UV light.

EXAMPLE 13

Thermal Oxidation of Tetrafluoroethylene

The reactor described in Example 1 is employed with 10 grams of tetrafluoroethylene and 10 grams of $CO_2$, except that the temperature employed is 100° C. and the oxidation is carried out in the absence of UV light.

EXAMPLE 14

Photochemical Removal of Peroxide Linkages

A perfluoropolyether is prepared according to any of the above examples which has peroxide linkages. The perfluoropolyether is subjected to further irradiation in a reaction medium comprising carbon dioxide to remove the peroxide linkages.

EXAMPLE 15

Thermal Removal of Peroxide Linkages

A perfluoropolyether is prepared according to any of the above examples which has peroxide linkages. The perfluoropolyether is subjected to heating in a reaction medium comprising carbon dioxide to remove the peroxide linkages.

EXAMPLE 16

Removal of Peroxide Linkages using Bromine

A perfluoropolyether is prepared according to any of the above examples which has peroxide linkages. The perfluoropolyether is subjected to reaction with bromine in a reaction medium comprising carbon dioxide to remove the peroxide linkages, and impart bromine-containing end groups to the compound.

EXAMPLE 17

Decomposition of Perfluoropolyether Peroxide in the Presence of a Functionalization Reagent A perfluoropolyether is prepared according to any of the above examples which has peroxide linkages. The linkages are decomposed in the presence of a reagent capable of reacting with the fluoroalkyl alkoxy radicals to yield end functional perfluoropolyethers.

EXAMPLE 18

Decomposition of Perfluoropolyether Peroxide in the Presence of a Vinyl Monomer

A perfluoropolyether is prepared according to any of the above examples which has peroxide linkages. The linkages are decomposed in the presence of a vinyl monomer capable of reacting with the fluoroalkyl alkoxy radicals to yield a copolymer.

EXAMPLE 19

Grafting of Perfluoropolyethers

A perfluoropolyether is prepared according to any of the above examples which has peroxide linkages. The linkages are decomposed in the presence of a polymer capable of undergoing grafting reactions with the fluoroalkyl alkoxy radicals to yield a copolymer.

The foregoing examples are illustrative of the present invention, and are not to be construed as limiting thereof. The invention is defined by the following claims, with equivalents of the claims to be included therein.

That which is claimed:

1. A process for preparing an oxidized olefin comprising:
   providing a reaction mixture comprising olefin, oxygen, and carbon dioxide such that the olefin and oxygen are soluble in the carbon dioxide, wherein said reaction mixture comprises from about 50 to 99 percent by weight of carbon dioxide; and
   combining the olefin with the oxygen in the carbon dioxide such that the olefin and the oxygen react and form the oxidized olefin which is soluble in the carbon dioxide.

2. The process according to claim 1 wherein said combining step is carried out in the presence of ultraviolet light.

3. The process according to claim 1 wherein the reaction mixture comprises supercritical carbon dioxide.

4. The process according to claim 1 wherein the reaction mixture comprises liquid carbon dioxide.

5. The process according to claim 1 wherein the reaction mixture comprises gaseous carbon dioxide.

6. The process according to claim 1 wherein the olefin is a fluoroolefin.

7. The process according to claim 6 wherein the fluoroolefin is selected from the group consisting of vinyl fluoride, trifluoroethylene, chlorotrifluoroethylene, bromotrifluoroethylene, 1,2-difluoroethylene, $CF_2=CFOCF_2CF(CF_3)OCF_2CF_2SO_2F$; $CF_2=CFOCF_2CF(CF_3)OCF_2CF_2CO_2CH_3$, $CF_2=CFOCF_2CF(CF_3)OCF_2CF_2CH_2OH$, tetrafluoroethylene, hexafluoropropylene, octafluoroisobutylene, perfluorobutene, perfluoropentene, perfluoro(methyl vinyl ether), perfluoro(propyl vinyl ether), perfluoro(ethyl vinyl ether), perfluoro(2,2-dimethyl-1,3-dioxole), and perfluorocyclobutene.

8. The process according to claim 1 wherein the oxidized olefin is selected from the group consisting of carbonyl fluoride, trifluoroacetyl fluoride, tetrafluoroethylene oxide, and hexafluoropropylene oxide.

9. The process according to claim 1 wherein the oxidized olefin is a polyether.

10. The process according to claim 1 wherein the oxidized olefin has peroxide linkages.

11. The process according to claim 1 wherein the oxidized olefin is a polyether copolymer of oxidized olefin units.

12. An oxidized olefin prepared according to the process of claim 1, wherein said oxidized olefin is a polyether.

13. An oxidized olefin prepared according to the process of claim 1, wherein said oxidized olefin is a polyether copolymer of oxidized olefin units.

14. A process for preparing an oxidized olefin comprising:
   providing a reaction mixture comprising olefin, oxygen, and carbon dioxide such that the olefin and oxygen are soluble in the carbon dioxide, wherein said reaction mixture comprises from about 50 to 99 percent by weight of carbon dioxide;

combining the olefin with the oxygen in the carbon dioxide such that the olefin and the oxygen react and form the oxidized olefin which is soluble in the carbon dioxide; and separating the oxidized olefin from the carbon dioxide.

15. The process according to claim 14 wherein said combining step is carried out in the presence of ultraviolet light.

16. The process according to claim 14 wherein the reaction mixture comprises supercritical carbon dioxide.

17. The process according to claim 14 wherein the reaction mixture comprises liquid carbon dioxide.

18. The process according to claim 14 wherein the reaction mixture comprises gaseous carbon dioxide.

19. The process according to claim 14 wherein the olefin is a fluoroolefin.

20. The process according to claim 19 wherein the fluoroolefin is selected from the group consisting of vinyl fluoride, trifluoroethylene, chlorotrifluoroethylene, bromotrifluoroethylene, 1,2-difluoroethylene, $CF_2=CFOCF_2CF(CF_3)OCF_2CF_2SO_2F$; $CF_2=CFOCF_2CF(CF_3)OCF_2CF_2CO_2CH_3$, $CF_2=CFOCF_2CF(CF_3)OCF_2CF_2CH_2OH$, tetrafluoroethylene, hexafluoropropylene, octafluoroisobutylene, perfluorobutene, perfluoropentene, perfluoro(methyl vinyl ether), perfluoro(ethyl vinyl ether), perfluoro(propyl vinyl ether), perfluoro(2,2-dimethyl-1,3-dioxole), and perfluorocyclobutene.

21. The process according to claim 14 wherein the oxidized olefin is selected from the group consisting of carbonyl fluoride, trifluoroacetyl fluoride, tetrafluoroethylene oxide, and hexafluoropropylene oxide.

22. The process according to claim 14 wherein the oxidized olefin is a polyether.

23. The process according to claim 14 wherein the polyether has peroxide linkages.

24. The process according to claim 14, wherein the oxidized olefin is a polyether copolymer of oxidized olefin units.

25. An oxidized olefin prepared according to the process of claim 14, therein said oxidized olefin is a polyether.

26. An oxidized olefin prepared according to the process of claim 14, wherein said oxidized olefin is a polyether copolymer of oxidized olefin units.

* * * * *

UNITED STATES PATENT AND TRADEMARK OFFICE
CERTIFICATE OF CORRECTION

PATENT NO.      :   5,872,157

DATED           :   February 16, 1999

INVENTOR(S)     :   DeSimone et al.

It is certified that error appears in the above-identified patent and that said Letters Patent is hereby corrected as shown below:

Column 12, line 21, claim 25,    "therein" should read --wherein--.

Signed and Sealed this

Twenty-seventh Day of July, 1999

Attest:

Q. TODD DICKINSON

*Attesting Officer*     *Acting Commissioner of Patents and Trademarks*